US011896532B2

(12) United States Patent
Jenkner et al.

(10) Patent No.: US 11,896,532 B2
(45) Date of Patent: Feb. 13, 2024

(54) ISOLATION APPARATUS

(71) Applicant: ISOVAC PRODUCTS LLC, Romeoville, IL (US)

(72) Inventors: Peter M. Jenkner, Downers Grove, IL (US); Christopher R. Schultz, Downers Grove, IL (US)

(73) Assignee: ISOVAC PRODUCTS LLC, Romeoville, IL (US)

( * ) Notice: Subject to any disclaimer, the term of this patent is extended or adjusted under 35 U.S.C. 154(b) by 0 days.

(21) Appl. No.: 17/721,855

(22) Filed: Apr. 15, 2022

(65) Prior Publication Data

US 2023/0329945 A1 Oct. 19, 2023

(51) Int. Cl.

*A61G 10/00* (2006.01)
*A61L 2/10* (2006.01)
*A61G 10/02* (2006.01)

(52) U.S. Cl.

CPC ........... *A61G 10/02* (2013.01); *A61G 10/005* (2013.01)

(58) Field of Classification Search

CPC ...... A61G 10/00; A61G 10/005; A61G 10/02; A61G 10/023

See application file for complete search history.

(56) References Cited

U.S. PATENT DOCUMENTS

| | | | | |
|---|---|---|---|---|
| 6,241,653 | B1 | 6/2001 | Gauger et al. | |
| 6,461,290 | B1 * | 10/2002 | Reichman | A61G 10/005 5/6 |
| 2009/0080811 | A1 | 3/2009 | Stefanek et al. | |
| 2013/0014794 | A1 * | 1/2013 | Jin | E04H 15/46 24/595.1 |
| 2015/0292231 | A1 * | 10/2015 | Gardner | E04H 15/58 135/144 |
| 2020/0085660 | A1 * | 3/2020 | Jenkner | A61G 1/00 |
| 2020/0316412 | A1 * | 10/2020 | Weber | A41D 13/0002 |

FOREIGN PATENT DOCUMENTS

| | | | | |
|---|---|---|---|---|
| WO | WO-9500958 A1 * | 1/1995 | | B25J 21/02 |

* cited by examiner

*Primary Examiner* — Christine H Matthews
*Assistant Examiner* — Joshua Daryl D Lannu
(74) *Attorney, Agent, or Firm* — Pauley Erickson & Swanson

(57) ABSTRACT

An isolation apparatus for the transport of a patient who is potentially infectious, who has been subjected to chemical or biological agents, such as SARS-CoV-2, or who is threatened by chemical/biological attack. The invention comprises a transparent or semi-transparent, generally tubular enclosure, having two opposite ends. Secured to each of the two opposite ends of this transparent or semi-transparent, tubular enclosure are a pair of end walls. Pass-through ports are provided to allow for introducing items, such as medicine, water, or medical tools, into the patient chamber without opening the apparatus.

20 Claims, 10 Drawing Sheets

ISOLATION APPARATUS

FIELD OF THE INVENTION

This invention relates generally to an isolation apparatus for isolating an individual patient either in chemical or biological incidents or in standard medical care and transport, such as for treatment of viruses such as SARS-CoV-2, and, more particularly, to an isolation apparatus with additional treatment features that allow treatment access to patients, as well as being collapsible when not in use.

BACKGROUND OF THE INVENTION

Governments and armed forces are increasingly concerned over the potential for the use of chemical or biological weapons in terrorist attacks or in warfare. The use of chemical or biological weapons create special concerns among rescuers. Particularly, unlike conventional weapons, exposure by rescuers to victims of chemical or biological attack can adversely affect these rescuers. To avoid such effects on rescuers, including medical and transport personnel, it is necessary to isolate the victims of the attack. Meanwhile, in the civilian sector it is increasingly required to treat all emergency patients as potentially infectious and hazardous to personnel and equipment. This requires the use of isolation techniques during transport and treatment. Further, the resurgence of virulent strains of other diseases, such as SARS-CoV-2, has required that the civilian medical community consider the need for individual isolation facilities.

SUMMARY OF THE INVENTION

A general object of the invention is to provide an improved isolation apparatus for isolating an individual patient, either in chemical or biological incidents or in connection with standard medical care and transport. The invention includes a generally tubular enclosure with two opposite ends, and with a transparent or semi-transparent portion for viewing the inner patient compartment and any person therein.

The general object of the invention can be attained, at least in part, through an isolation apparatus including an enclosure having a base to receive the patient thereon, and an upper enclosure component connected to the base and enclosing a patient chamber over the base. The upper enclosure component includes a transparent window panel and two opposite end walls. The enclosure is desirably collapsible and/or foldable into a collapsed form having a reduced length and a diameter no larger than that of the expanded enclosure. The isolation apparatus includes a blower attachment configured to receive a blower to create a negative pressure within the enclosure.

The upper enclosure can be attached to the base by a zipper extending between the base and three sides of the upper enclosure component. A zipper flap on the external surface of the upper enclosure component can be used to cover the zipper when closed. The zipper flap desirably includes a transparent panel at least over a top stop end of the zipper, allowing for checking a zipper position through the flap.

The upper enclosure component includes one or more glove arms extendable into the patient chamber and accessible from outside the enclosure. In embodiments of this invention, each of the glove arms includes a retraction tab connected inside the glove arm for pulling and retracting the glove arm from the patient chamber. The retraction tab desirably includes a fastener corresponding to a counterpart fastener on an outer surface of the upper enclosure component, such as for securing the glove arm in the retracted position.

The enclosure can include one or more medical ports, such as including at least one access tube configured to receive medical tubing and/or wiring therethrough. The medical port can include a removable cap for each of the at least one access tube.

Embodiments of this invention include a pass-through port, such as in the upper enclosure component, as an airlock-type passage for introducing and/or removing items from the patient compartment without opening the isolation apparatus. The pass-through port generally includes a passage with an internal end adjacent and/or within the patient chamber, and an external end outside of the patient chamber, wherein each of the internal end and the external end includes a resealable opening, such as a zippered opening. The pass-through port is configured to receive an object into the passage through the external end, and when an external end resealable opening is closed, an internal end resealable opening can be opened, such as using the glove arms, to access the object from the passage through the internal end. The reverse can be implemented to remove an item.

The pass-through port can be formed of any suitable 'airlock' structure, such as a tube or equivalent. In embodiments of this invention, the pass-through port comprises a flexible material surrounding the passage. When not in use, the flexible material can be folded or rolled and secured against the external surface of the upper enclosure component by straps or other suitable fastener.

In embodiments wherein the apparatus is collapsible or foldable, the enclosure can include one or more removable and/or foldable longitudinal spines configured to extend along a length of the upper enclosure component. The upper enclosure component can include a longitudinal sleeve configured to receive the longitudinal spine. The sleeve is desirably open at one end to receive the spine, and the end is closable by any suitable means, such as by being foldable at or over the opening and fastened back to itself to enclose the spine.

In embodiments of this invention, the upper enclosure component is supported about the patient by a plurality of spaced apart lateral ribs, each lateral rib configured to flex and press outward on the upper enclosure component. The lateral ribs can be formed of any suitable material, such as a fiberglass impregnated polymer material. In embodiments of this invention each rib is a two-layered rib structure is used, a first shaped rib matching the shape of the upper enclosure, and a second internal rib to provide an outward biasing force on the first rib. The outer rib can be polycarbonate, and the internal biasing rib can be fiberglass based.

The ribs desirably 'float' within the enclosure, in that they are not fixed to, or laminated between, the enclosure panels. The ribs can be held at opposing ends in rib pockets connected to the upper enclosure component. The individual ribs (including multi-layered rib pairs) are further secured to the upper enclosure component by a plurality of straps. In presently preferred embodiments, the strap adjacent (e.g., upstream on the rib) to one of the rib pockets is connected along an inside of the each lateral rib to the corresponding rib pocket by an adjustable fastener. Thus the rib can be tightened in place as needed.

In embodiments of this invention, the enclosure includes a fastener near an upper portion of the patient chamber and configured to receive a light source. Desirably, the fastener is configured to reduce emission of outward light through the transparent window panel. The light source can be a chemical light stick, such as attached by a hook and loop fastener.

The isolation apparatus includes filters and desirably a blower to pass air into and through the chamber to the patient. In embodiments of this invention, at least one of the two opposite end walls includes a blower and/or filter assembly attachment point, such as including a plurality of straps configured to removably secure the blower and/or filter assembly. The end further includes at least one blower/filter connection port. The other end desirably includes a plurality of filter ports, thus allowing air flow in through one end and out the other, over the patient.

Other objects and advantages will be apparent to those skilled in the art from the following detailed description taken in conjunction with the appended claims and drawings. Any of the individual features discussed herein can be used in an apparatus individually or in any varying combination, depending on need.

DETAILED DESCRIPTION OF THE INVENTION

Figure 1:
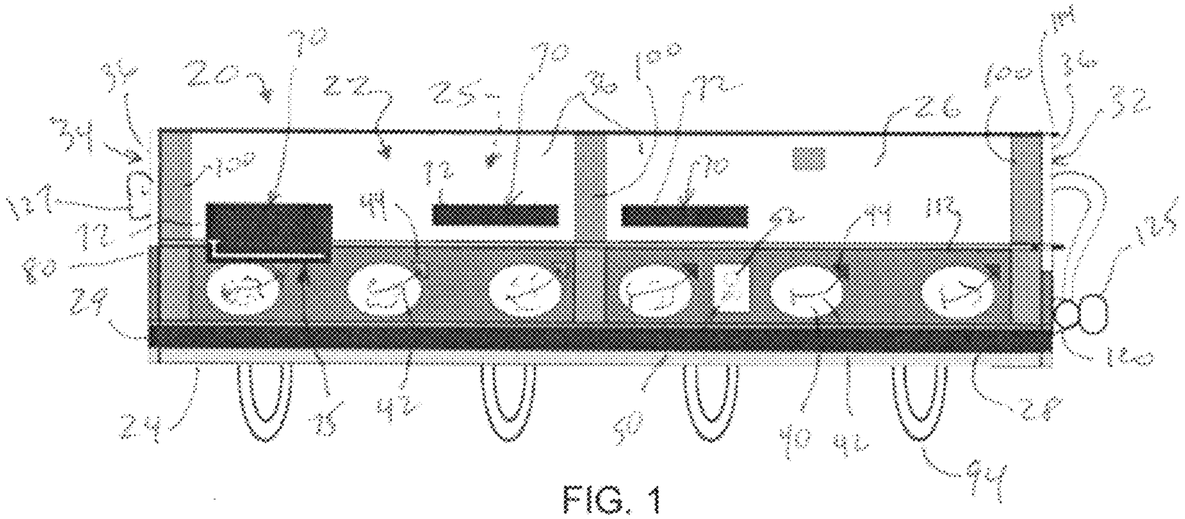
FIGS. 1-6 are views of an isolation apparatus according to one embodiment of this invention.
Figure 2:
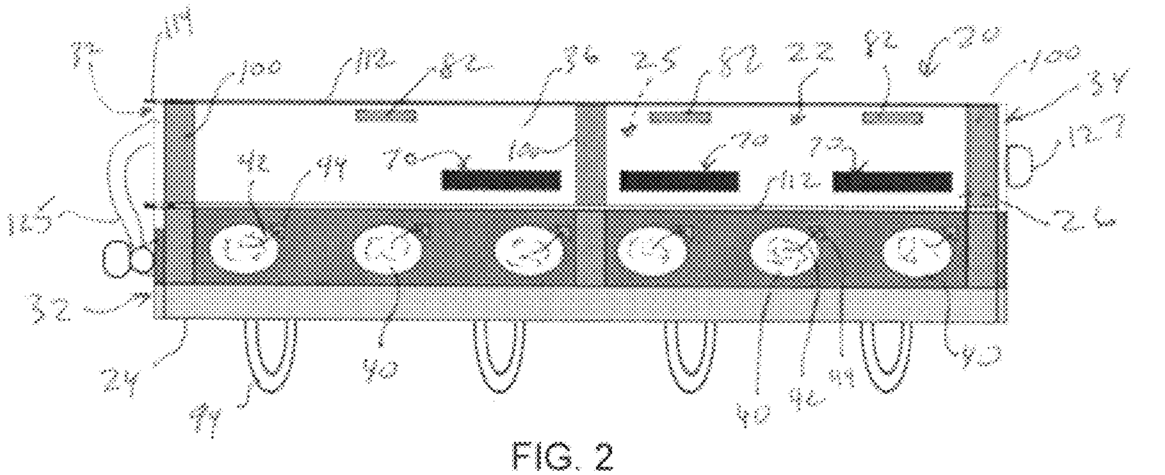
Figure 3:
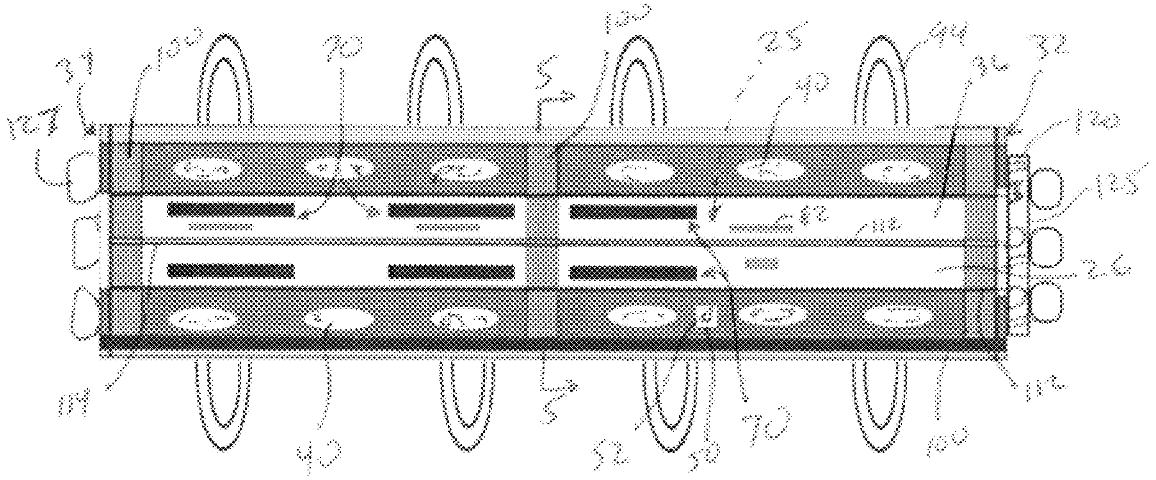

The present invention provides an isolation apparatus for transporting patients.

FIGS. 1-6 show a schematic representation of an isolation apparatus 20 according to one embodiment of this invention. The apparatus 20 includes an enclosure 22 enclosing a patient chamber 25. The enclosure includes a base 24 to receive the patient thereon, and an upper enclosure component 26 connected to the base 24 and enclosing the patient chamber 25 over the base 24.

Figure 4:
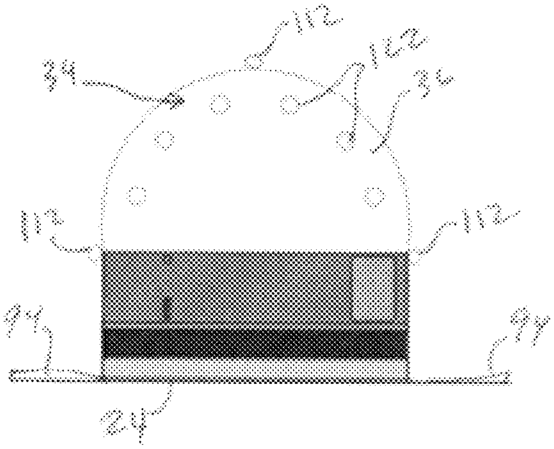
Figure 5:
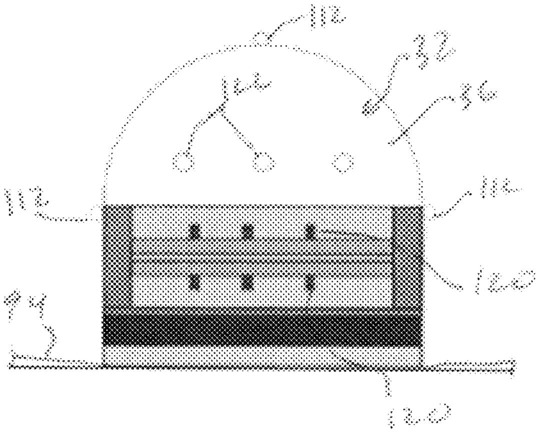

The upper enclosure component 26 is integrally and fixedly connected to the base 24 along one longitudinal side (FIG. 2), and by a zipper 28 on the remaining three sides FIGS. 1, 4, and 5). In this manner, the apparatus 20 is a 'suitcase' enclosure that can be hinged open along the non-zippered side. All panels of the isolation apparatus are at least partially, and desirably mostly or fully, formed of selectively permeable material that provides a chemical warfare agent resistance and particulate barrier with respect to biological pathogens and radiological particulates. One suitable material is Gore® Chempak®. A heat bonding process is desirably used, such as in addition to (e.g., over) seaming, providing a 100% seal.

The zipper closure is desirably a gas and liquid tight zipper. The zipper 28 runs along one side and both ends of the apparatus 20, to provide the suitcase style opening as shown in the embodiment view of FIG. 10. An external zipper flap 29 can be used to provide mechanical protection over the zipper. A clear window in the flap can be provided at the zipper closed end to allow visual verification of full zipper closure. An internal zipper flap of the Gore® Chempak® material can be used to provide extra CWA leakage protection, and can be held in place with a suitable hook & loop fastener.

The upper enclosure component 26 includes a longitudinal panel 30 and two opposite end walls 32 and 34. The upper enclosure component 26 includes one or more transparent window panels 36, illustrated as on each of the longitudinal panel 30 and the two end walls 32, 34 (FIGS. 4-5). The transparent panels 36 allow viewing into the patient chamber.

The upper enclosure component 26 includes a plurality of glove arms 40, as are known in the industry, which are sealed to the enclosure and extendable into the patient chamber. The glove arms 40 are accessible from outside the enclosure to permit medical intervention even when the zipper 28 of the apparatus 20 is closed and the apparatus 20 is sealed. The illustrated apparatus 20 includes twelve glove arms 40. As shown, pairs of the glove arms 40 are placed opposite each other, i.e., six on each of the two lengthwise sides of the apparatus 20. Various numbers and configurations of glove arms are available, depending on need.

In embodiments of this invention, each of the glove arms 40 includes a retraction tab 42 connected at one end inside the glove arm 40 for retracting the glove arm 40 from within the patient chamber. Desirably, the retraction tab 42 has a free end that is pulled by a user and then is fastenable to a counterpart fastener 44 on an outer surface of the upper enclosure component 26, to hold the glove 40 in a retracted state. Suitable fasteners include hook and loop fasteners, snaps, hooks, or equivalent.

In embodiments of this invention, the upper enclosure component 26 includes a medical port 50 to allow access for medical device tubing, power cords, etc. The illustrated medical port 50 includes three access tubes 52 configured to receive medical tubing and/or wiring therethrough. The medical port tubes 52 can include a removable cap or other suitable closure when not in use. Tape or other sealant can be used around the caps or around the inserted tubing/wires to create a barrier.

The upper enclosure component desirably includes a plurality of pass-through ports, each including an interior space alternatively closeable at opposite ends. Each pass-through port allows for introduction to or removal from the patient chamber of a sealed apparatus without breaking containment, or opening the enclosure zipper. The pass-through port of this invention includes an access opening to the patient chamber that is initially closed. A person on the outside of the apparatus can place an item (medicine, thermometers, syringes, water, food, etc.) into the pass-through port from an outer access, close the outer access, and open the inner access opening to retrieve the item on the inside of the patient chamber. The inner access can be opened by a glove arm, or by the person contained therein. Ideally, each of the opposing inside and outside closable openings remain closed until needed, then followed by only one side opened at a time.

In embodiments of this invention, such as shown in FIGS. 1-6, the pass-through ports 70 are formed of a flexible material pouch 72 that can be rolled up and fastened to the upper enclosure component 26 when not in use. The pouch 72 includes a passage with an internal end 74 adjacent and/or within the patient chamber 25, and an external end 75 outside of the patient chamber 25. Each of the internal end 74 and the external end 75 include a resealable opening 76, 78 that allows for access into and through the pouch 72. As illustrated each resealable opening 76, 78 is or includes a zipper with a zipper pull 80 for ease of use. The upper enclosure component 26 desirably includes straps 77 configured to secure the flexible material pouch 72 in a folded or rolled configuration.

The upper enclosure component 26 includes optional illumination points 82, which can be any suitable light source. In embodiments of this invention, the points 82 are connection points for chemical light sticks (i.e., 'glow sticks'), which can be secured by any suitable fastener. One preferable fastener is a hook and loop fastener, which allows for quick and easy attachment or replacement using glove arms 40 to receive a glow stick via the pass-through port 70. Desirably the illumination points 82 are opaque, such that the light is blocked from emanating directly outward from the points, to reduce exposure in hostile areas.

Figure 6:
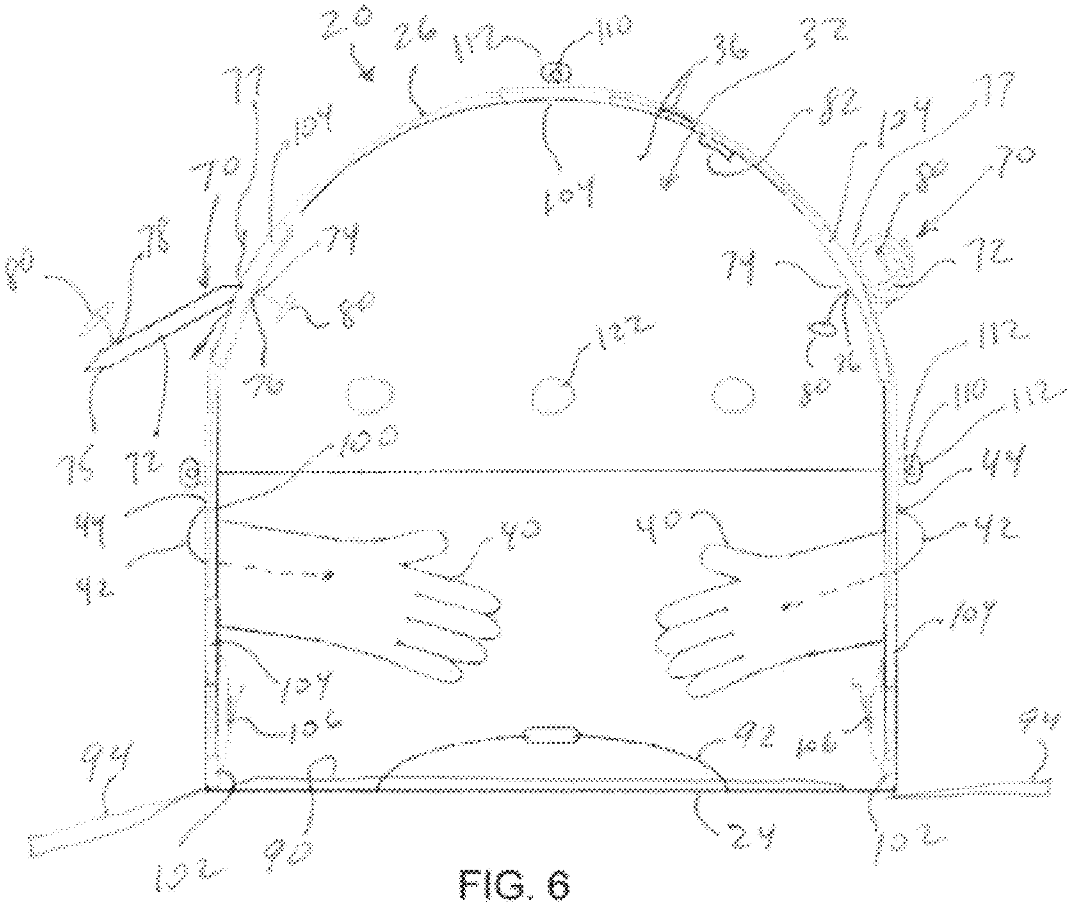

As shown in FIG. 6, the patient compartment desirably includes a base mat 90. The mat 90 can be any suitable material, such as including a liquid and/or contaminant absorbent material. Patient securement straps 92 extend from the base 24 to secure the patient, such as during transport. The base 24 further includes reinforcing straps 94, with lateral ends formed into loops. The loops serve as handholds, through which persons may grasp the isolation apparatus and transport the patient to another site for medical care.

The upper enclosure component 26 is supported along the longitudinal length by spaced lateral ribs 100. In the illustrated embodiment, three ribs 100 are used, one at each end and one in the middle, but various configurations and numbers can be used depending on need and the type of ribs used. The ribs 100 desirably flex outward against the upper enclosure component 26. In embodiments of this invention, each of the ribs 100 is formed of two separate rib structures, which may be fixed together or simply held together by enclosure components. A first shaped rib matches the shape of the upper enclosure, and a second rib, internal and adjacent the first rib, provides an outward biasing force on the first rib. The first rib can be formed of a rigid polymer, such as polycarbonate material. The second rib can be a fiberglass material, such as a fiberglass impregnated polymer material, which is bent into place against the outer rib to provide outward biasing.

In embodiments of this invention, the lateral ribs 100 are formed of a fiberglass impregnated polymer material. The ribs can be fixedly integrated into the upper enclosure component 26, such as between material layers, or can be secured by fastening points to the inner surface of the upper enclosure component 26. As shown in FIG. 6, each lateral rib 100 has each of the ribs opposing ends secured in a corresponding pocket 102 attached to the inner surface of the upper enclosure component 26. The lateral rib 100 is further secured to the upper enclosure component 26 by several sleeves or straps 104 affixed to the inner surface of the upper enclosure component 26 and spaced along the length of the rib 100. Each of the pockets 102 is connected on an inside surface to an adjacent strap 104 by an adjustable fastener 106, such as a buckle. The fastener 106 allows for installation and/or tightening of the rib 100 to the inner surface of the upper enclosure component 26.

The isolation apparatus of this invention is preferably foldable into a collapsed form having a reduced length, desirably with a diameter no larger than that of the expanded enclosure. This allows for improved storage and transport until needed. In FIGS. 1-6, the upper enclosure component 26 is supported in the expanded use position as shown, along its length, by three removable and/or foldable longitudinal spines 110. Each spine 110 can be folded or removed to allow for collapsing. As shown, each spine 110 is disposed in a spine sleeve 112 that is attached to the outer surface of the upper enclosure component 26. The spine 110 is inserted through an open end of the spine sleeve 112. The open end of the spine sleeve 112 includes a flap extension 114 that folds over the open end to secure the spine 110 in the sleeve 112. The flap extension 114 includes a fastener to attach back to the outer surface of the spine sleeve 112. The fastener can be a buckle, such as a side release buckle, or any other suitable fastener.

The isolation apparatus of this invention is preferably used with a blower and/or filter system. Airflow to the patient can be provided by, for example, a battery-powered PAPR (powered air-purifying respirator) blower fitted with chemical, biological, radiological and nuclear (CBRN) filters. A 7 cfm (min) rated blower provides approximately 18 to 21 air changes per hour within the isolator depending on patient volume. The apparatus can be operated with positive or negative pressure. FIG. 5 shows an end wall 32 of the upper enclosure component 26 including a plurality of straps 120 configured to removably secure the blower and/or filter apparatus 125. The end wall 32 further includes blower and/or filter connection ports 122. The opposing end 34 further includes blower and/or filter connection ports 122, such as for CBRN filters 127.

FIGS. 7-16 show an isolation apparatus 220 according to one embodiment of this invention. The apparatus includes an enclosure 222 enclosing a patient chamber 225. The enclosure includes a base 224 to receive the patient thereon, and an upper enclosure component 226 connected to the base and enclosing the patient chamber 225 over the base 224.

The upper enclosure component 226 is integrally and fixedly connected to the base 224 along one longitudinal side (See FIG. 10), and by a zipper 228 on the remaining three sides. In this manner, the apparatus 220 is a 'suitcase' enclosure that can be hinged open along the non-zippered side. All panels of the isolation apparatus 220 are at least partially, and desirably mostly or fully, formed of selectively permeable material that provides a chemical warfare agent resistance and particulate barrier with respect to biological pathogens and radiological particulates.

Figure 10:
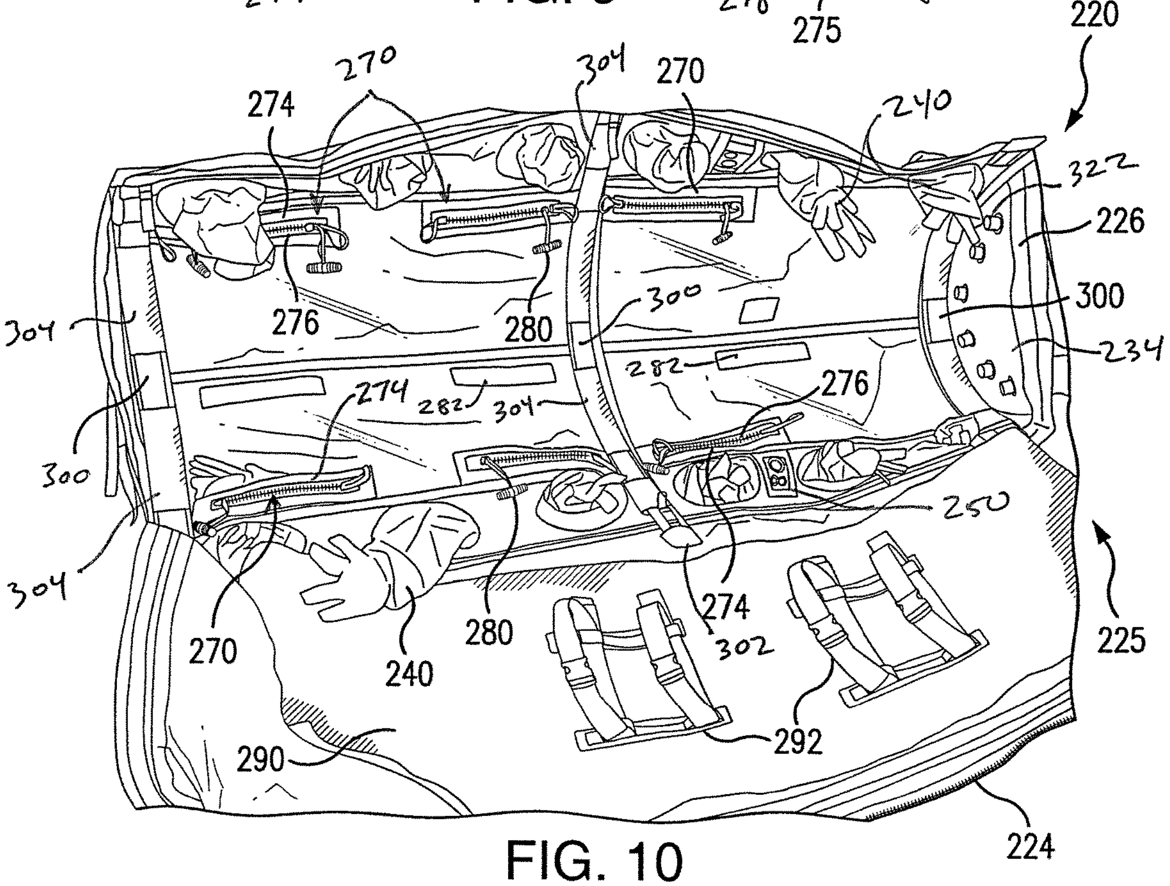
Figure 11:
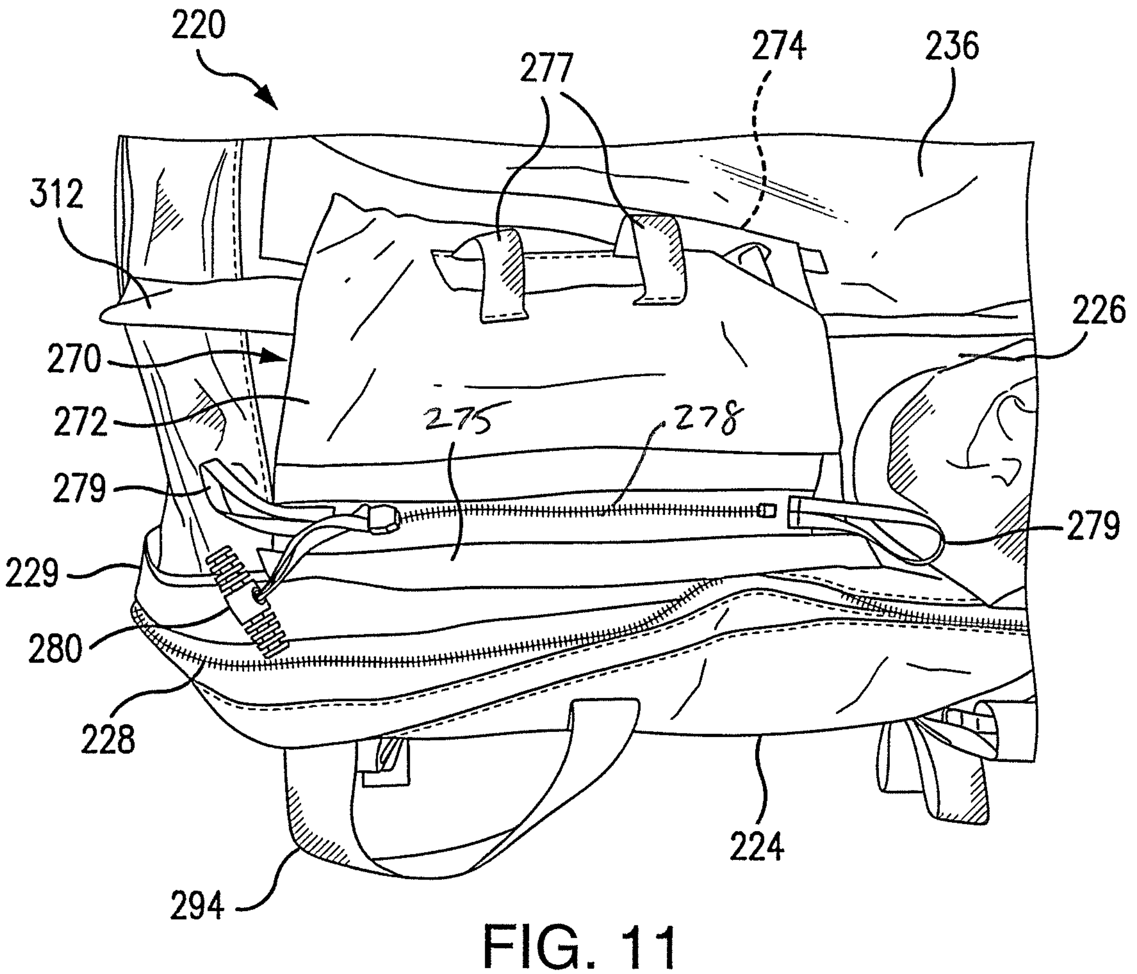

The zipper closure is desirably a gas and liquid tight zipper. The zipper 228 runs along one side and both ends of the apparatus 220, to provide the suitcase style opening as shown in FIG. 10. An external zipper flap 229 provides mechanical protection over the zipper.

The upper enclosure component 226 includes a longitudinal panel 230 and two opposite end walls 232 and 234. The upper enclosure component 226 includes one or more transparent window panels 236, illustrated as on each of the longitudinal panel 230 and the two end walls 232, 234. The transparent panels allow viewing into the patient chamber.

The upper enclosure component 226 includes a plurality of glove arms 240, which are sealed to the enclosure and extendable into the patient chamber. The glove arms 240 are accessible from outside the enclosure to permit medical intervention even when the zipper 228 of the apparatus 220 is closed and the apparatus 220 is sealed. The illustrated apparatus 220 includes twelve glove arms 240. As shown, pairs of the glove aims 240 are placed opposite each other, i.e., six on each of the two lengthwise sides of the apparatus 220.

In embodiments of this invention, each of the glove arms 240 includes a retraction tab 242 connected at one end inside the glove arm 240 for retracting the glove arm 240 from within the patient chamber. Desirably, the retraction tab 242 has a free end that is pulled by a user and then is fastenable to a counterpart fastener 244 on an outer surface of the upper enclosure component 226, to hold the glove 240 in a retracted state. Suitable fasteners include hook and loop fasteners, snaps, hooks, or equivalent.

In embodiments of this invention, the upper enclosure component 26 includes a medical port 250 to allow access for medical device tubing, power cords, etc. The illustrated medical port 250 includes three access tubes 252 configured to receive medical tubing and/or wiring therethrough. The medical port tubes 252 can include a removable cap 256 or other suitable closure when not in use. Tape 258 or other sealant can be used around the caps or around the inserted tubing/wires to create a barrier.

The upper enclosure component 226 further includes a plurality of pass-through ports 270, each including an interior space alternatively closeable at opposite ends. The pass-through ports 270 are formed of a flexible material pouch 272 that can be rolled up and fastened to the upper enclosure component 226 when not in use. The pouch 272 includes a passage with an internal end 274 adjacent and/or within the patient chamber 225, and an external end 276 outside of the patient chamber 225. Each of the internal end 274 and the external end 275 include a resealable opening 276, 278 that allows for access into and through the pouch 272. As illustrated, each resealable opening 276, 278 is or includes a zipper with a zipper pull 280, and opposing pull tabs 279 for ease of use. The upper enclosure component 226 desirably includes straps 277 configured to secure the flexible material pouch 272 in a folded or rolled configuration.

The upper enclosure component 226 includes illumination points 282, which can be any suitable light source, such as chemical light sticks (i.e., 'glow sticks'). One preferable fastener is a hook and loop fastener, which allows for quick and easy attachment or replacement using glove arms 240 to receive a glow stick via the pass-through port 270. The illumination points 282 are opaque, such that the light is blocked from emanating directly outward from the points, to reduce exposure in hostile areas.

Figure 9:
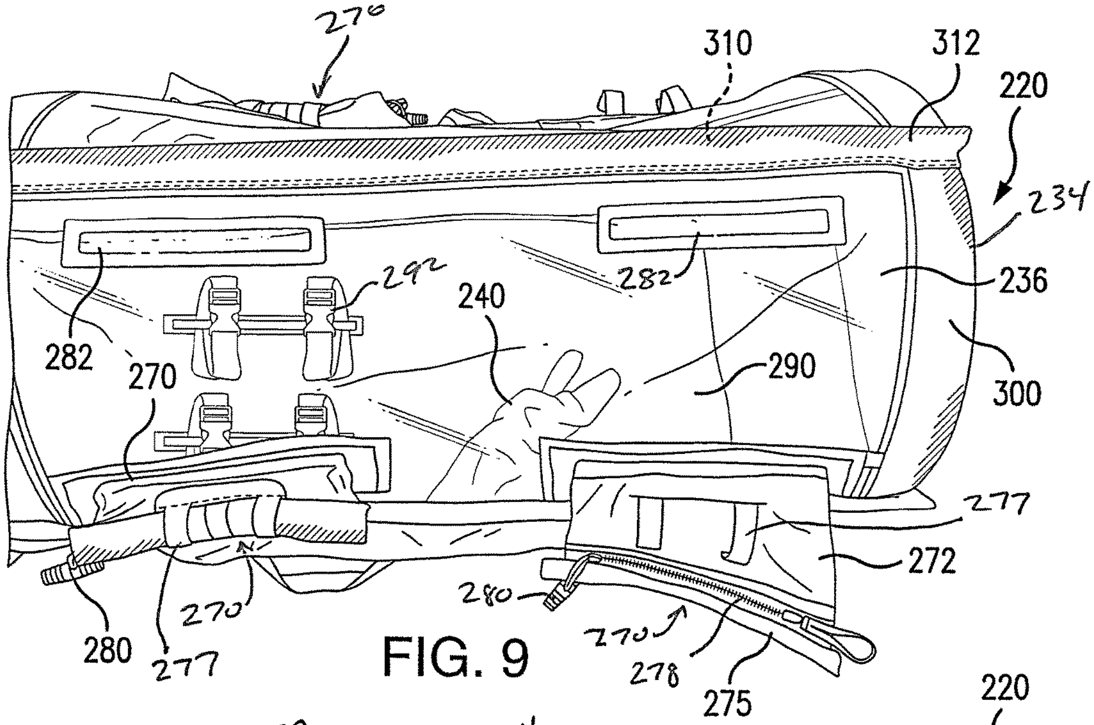

As shown in FIGS. 9 and 10, the patient compartment 225 desirably includes a base mat 290. The mat 290 can be any suitable material, such as including a liquid and/or contaminant absorbent material. Patient securement straps 292 extend from the base 224 to secure the patient, such as during transport. The base 224 further includes reinforcing straps 294, with lateral ends formed into handhold loops.

Figure 15:
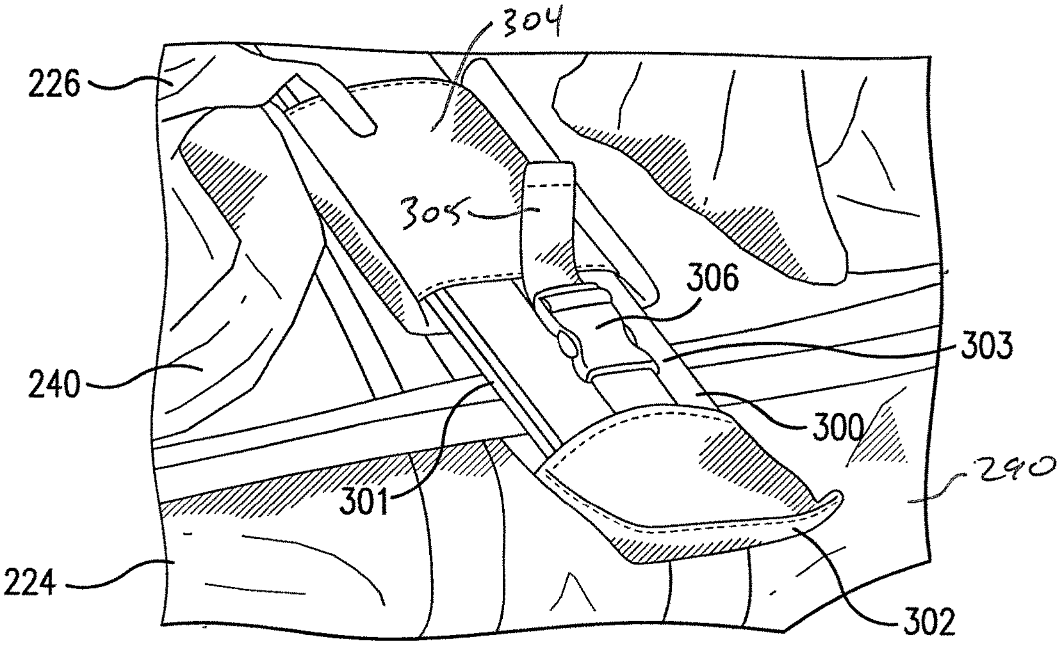

The upper enclosure component 226 is supported along the longitudinal length by spaced lateral ribs 300. In the illustrated embodiment, three ribs 300 are used, one at each end and one in the middle, but various configurations and numbers can be used depending on need and the type of ribs used. The ribs desirably flex outward against the upper enclosure component 226. As shown in FIG. 15, the ribs 300 are formed of a two-tiered rib structure, such as a rigid outer rib 301 and an outward biasing inner rib 303, such as formed of the materials discussed above. The two ribs can be fixed together or held adjacent by the enclosure components discussed below.

The ribs 300 can be fixedly integrated into the upper enclosure component 226, such as between material layers, or can be secured by fastening points to the inner surface of the upper enclosure component 226. As shown in FIGS. 10 and 13-15, each lateral rib 300 has each of opposing ends secured in a corresponding pocket 302 attached to the inner surface of the upper enclosure component 226. The lateral rib 300 is further secured to the upper enclosure component by several sleeves or straps 304 affixed to the inner surface of the upper enclosure component 226 and spaced along the length of the rib 300. Each of the pockets 302 is connected on an inside surface to an adjacent strap 304 by an adjustable fastener, such as a strap 305 with a buckle 306. The buckle 306 allows for installation and/or tightening of the rib 300 to the inner surface of the upper enclosure component 226.

Figure 7:
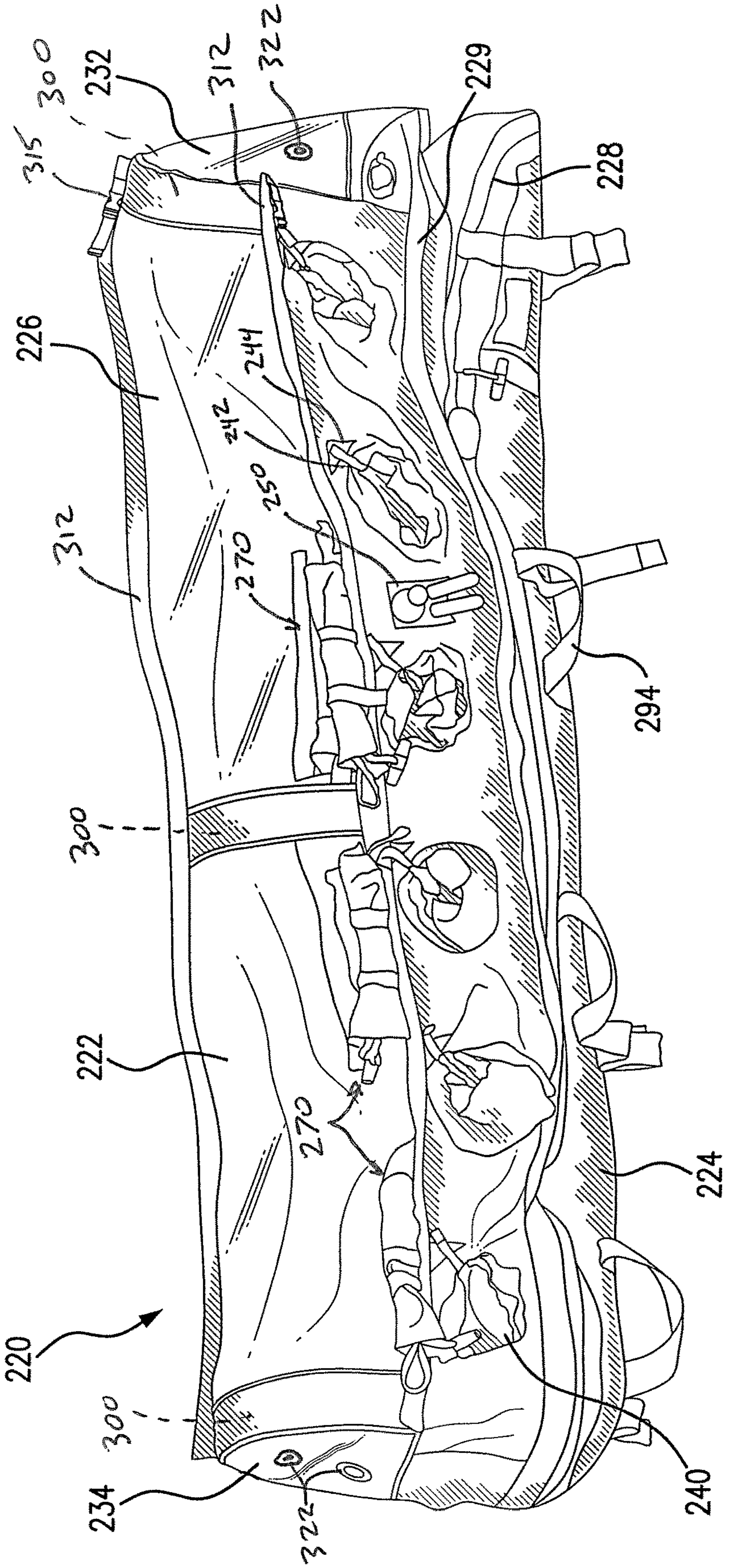
FIGS. 7-16 are views of an isolation apparatus according to one embodiment of this invention.
Figure 8:
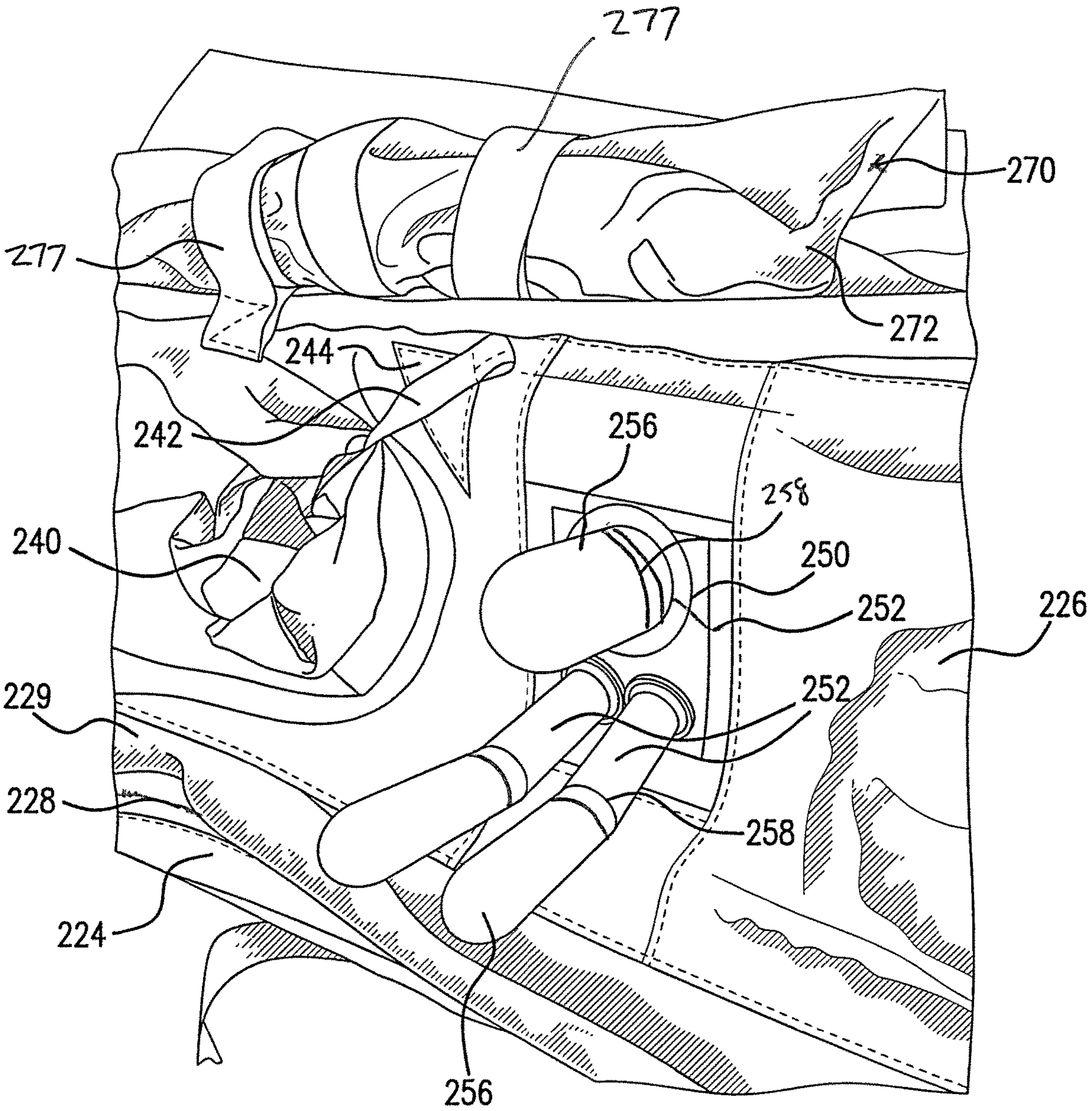
Figure 12:
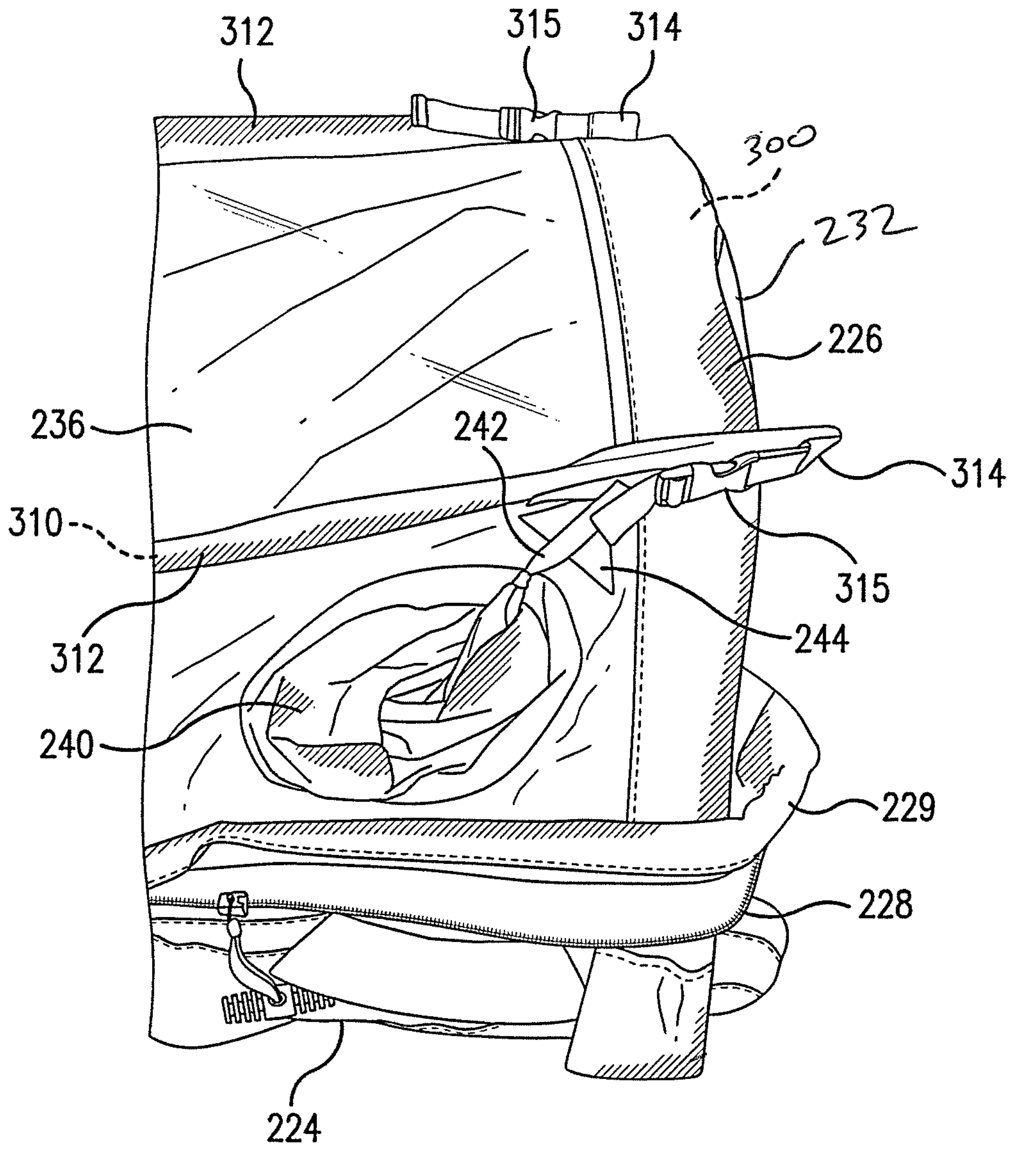
Figure 13:
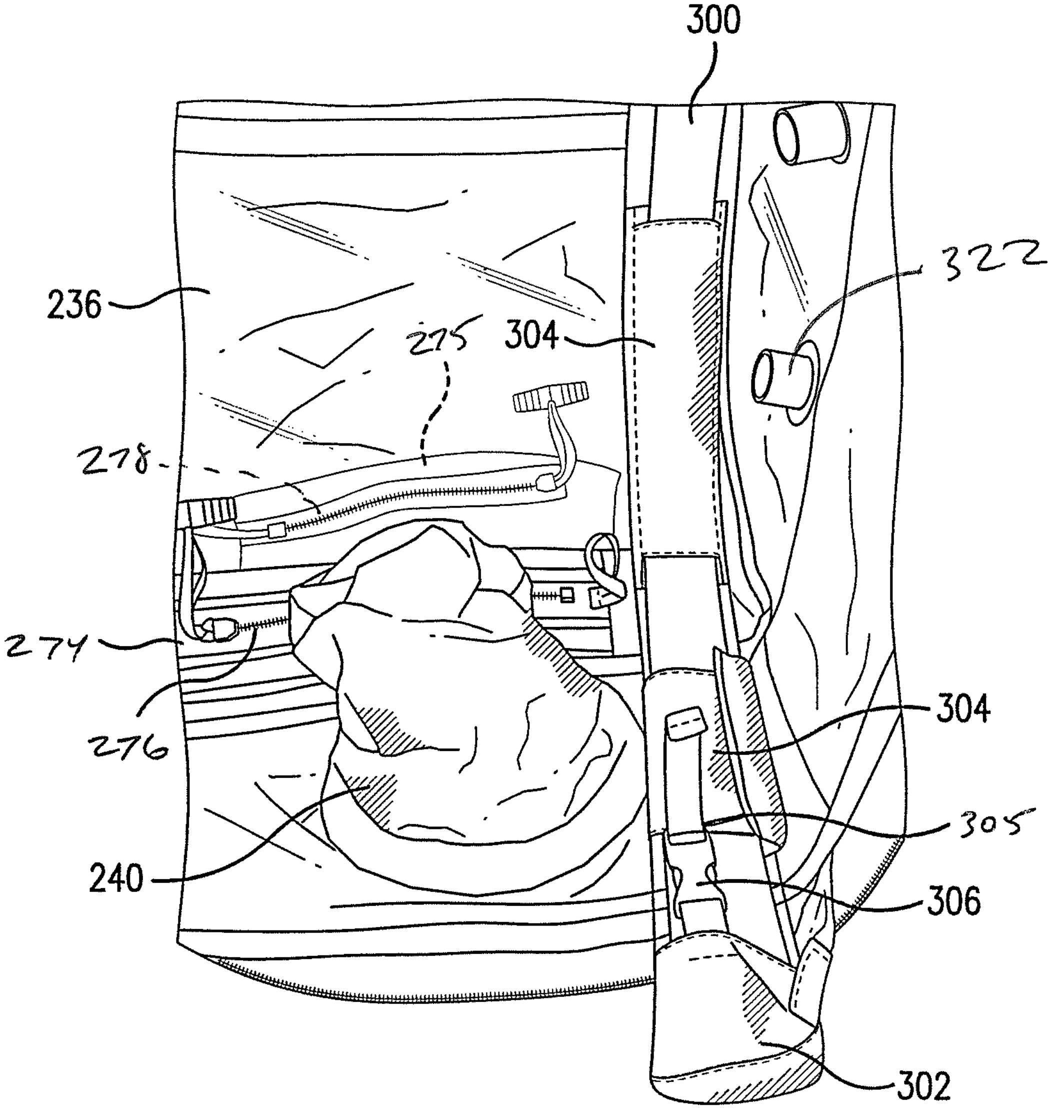
Figure 14:
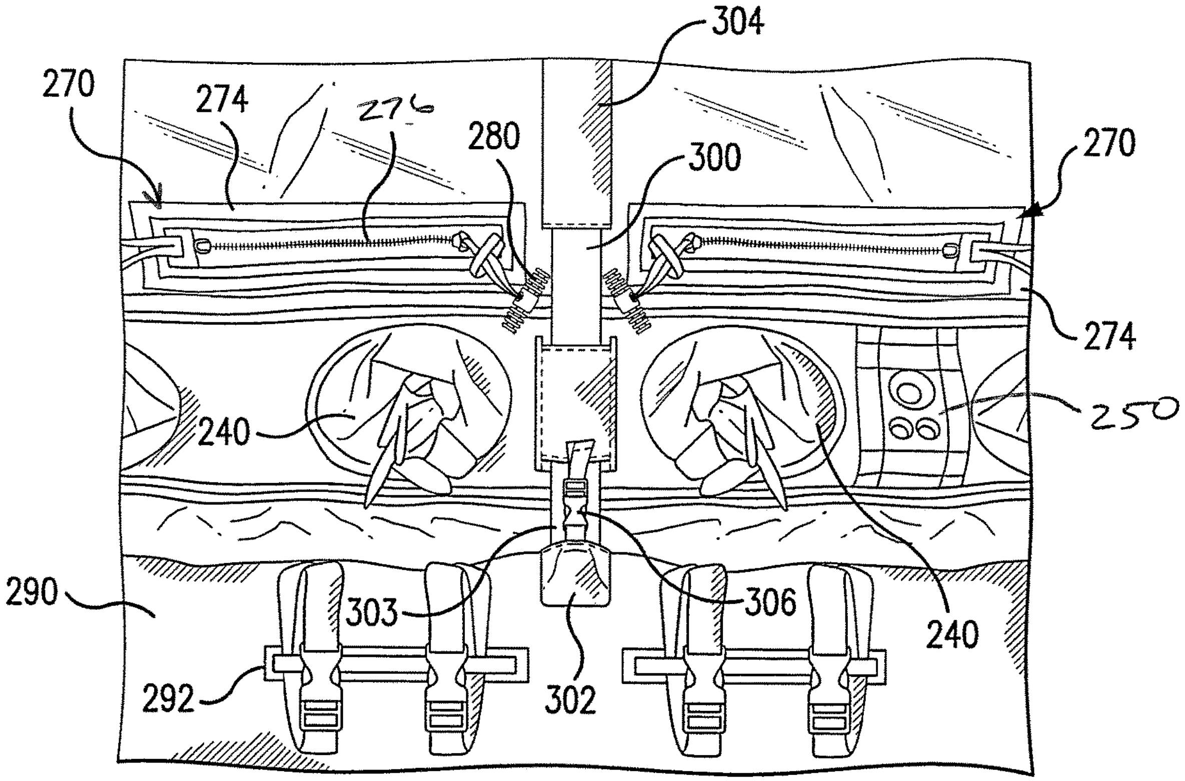

The isolation apparatus of this embodiment also is preferably foldable into a collapsed form having a reduced length, desirably with a diameter no larger than that of the expanded enclosure. FIGS. 7, 9, and 12 show the upper enclosure component 226 supported in the expanded use position as shown, along its length, by three removable and/or foldable longitudinal spines 310. Each spine 310 can be folded or removed to allow for collapsing. As shown, each spine 310 is disposed in a spine sleeve 312 that is attached to the outer surface of the upper enclosure component 226. The spine 310 is inserted through an open end of the spine sleeve 312, as shown in FIG. 12. The open end of the spine sleeve 312 includes a flap extension 314 that folds over the open end to secure the spine 310 in the sleeve 312. The flap extension 314 includes a side release buckle 315, but can be any other suitable fastener.

Figure 16:
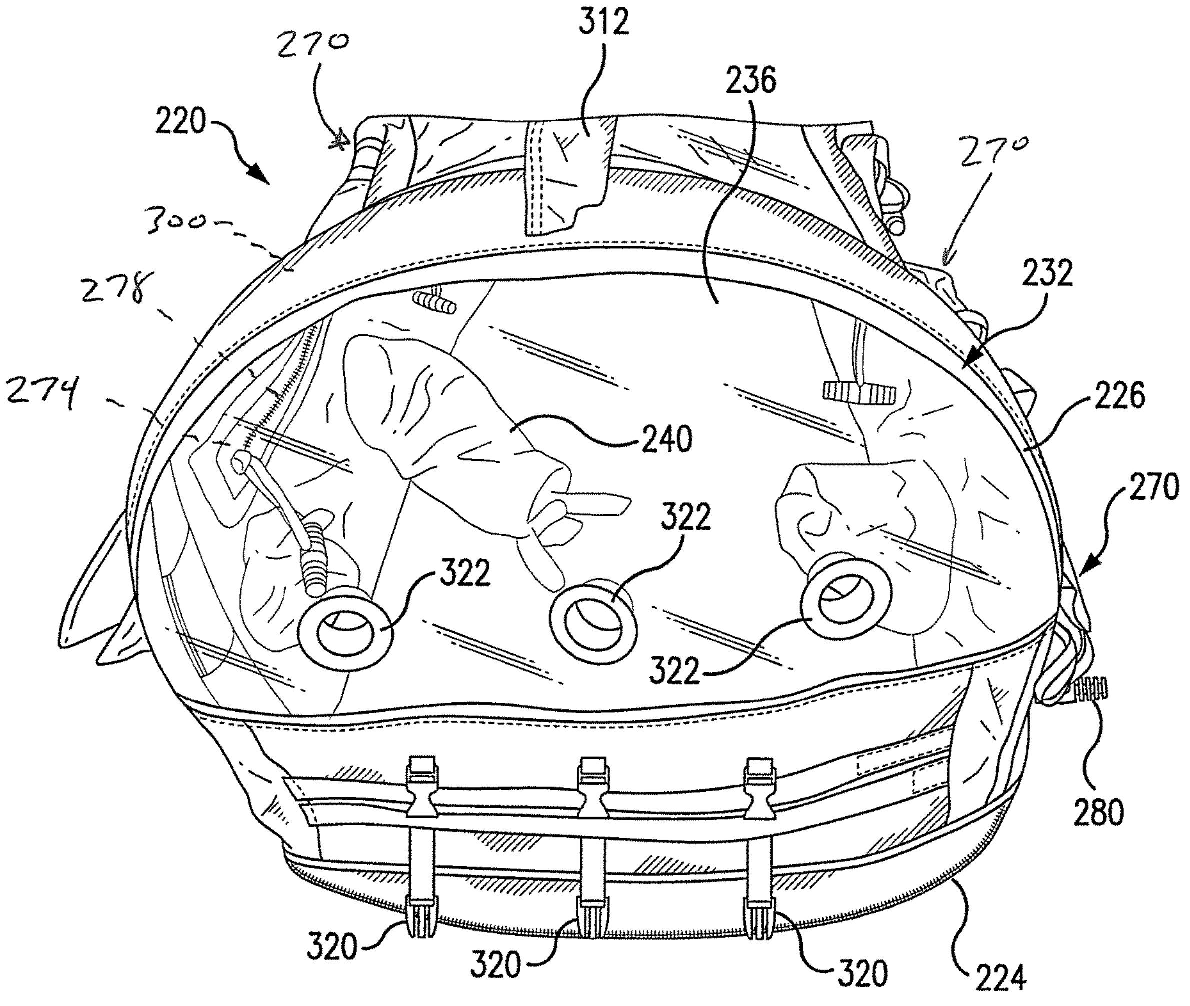

FIG. 16 shows end 232 adapted for receiving a blower and/or filter system, such as discussed above. The apparatus can be operated with positive or negative pressure. FIG. 16 shows a plurality of straps 320 configured to removably secure the blower and/or filter apparatus. The end wall 232 further includes blower and/or filter connection ports 322. The opposing end 234 further includes blower and/or filter connection ports 322.

Thus, the invention provides an isolation apparatus for isolating an individual patient either in chemical or biological incidents or in standard medical care and transport. The apparatus includes the above provided additional treatment features that allow treatment access to patients, as well as being collapsible when not in use.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An isolation apparatus for transporting a patient comprising:

an enclosure having a base to receive the patient thereon, and an upper enclosure component connected to the base and enclosing a patient chamber over the base, the upper enclosure component including a transparent window panel and two opposite end walls, and the enclosure being foldable into a collapsed form having a reduced length and a diameter no larger than that of an expanded enclosure;

the upper enclosure component comprising a glove arm extendable into the patient chamber and accessible from outside the enclosure, the glove arm including a retraction tab connected at a first end inside the glove arm for retracting the glove arm within the patient chamber, wherein the retraction tab includes a second end opposite the first end, the second end embodied as a free end adapted to be pulled to retract the glove arm, the second end including a fastener corresponding to a counterpart fastener adjacent the glove arm on an outer surface of the upper enclosure component, and a blower attachment.

2. The isolation apparatus according to claim 1, further comprising a medical port including at least one access tube configured to receive medical tubing and/or wiring therethrough, the medical port including a removable cap for each of the at least one access tube.

3. The isolation apparatus according to claim 1, wherein the upper enclosure component comprises a pass-through port including a passage with an internal end adjacent and/or within the patient chamber, and an external end outside of the patient chamber, wherein each of the internal end and the external end comprises a resealable opening, wherein each resealable opening comprises a zipper, and the pass-through port is configured to receive an object into the passage through the external end, and when an external end resealable opening is closed, an internal end resealable opening can be opened to access the object from the passage through the internal end.

4. The isolation apparatus according to claim 3, wherein the pass-through port comprises a flexible material surrounding the passage, and the upper enclosure component comprises straps configured to secure the flexible material in a folded or rolled configuration.

5. The isolation apparatus according to claim 1, further comprising a removable and/or foldable longitudinal spine configured to extend along a length of the upper enclosure component, wherein the upper enclosure component comprises a sleeve configured to receive the longitudinal spine.

6. The isolation apparatus according to claim 1, wherein the upper enclosure component is supported by a plurality of spaced apart lateral ribs, each lateral rib is configured to flex and press outward on the upper enclosure component, and each lateral rib is secured at opposing ends in rib pockets connected to the upper enclosure component.

7. The isolation apparatus according to claim 1, wherein a first of the two opposite end walls comprises: a plurality of straps configured to removably secure the blower, and a blower connection port; and a second of the two opposite end walls comprises a plurality of filter ports.

8. The isolation apparatus according to claim 1, further comprising a zipper extending between the base and three sides of the upper enclosure component, and a zipper flap on the outer surface of the upper enclosure component and configured to cover the zipper when closed.

9. An isolation apparatus for transporting a patient, comprising:

an enclosure having a base to receive the patient thereon, and an upper enclosure component connected to the base and enclosing a patient chamber over the base, the upper enclosure component including a transparent window panel and two opposite end walls, and the enclosure being foldable into a collapsed form having a reduced length and a diameter no larger than that of an expanded enclosure;

a removable and/or foldable longitudinal spine configured to extend along a length of the upper enclosure component;

the upper enclosure component including a sleeve configured to receive the longitudinal spine, wherein the sleeve includes an opening at a first end to receive the spine, and the first end is foldable over the opening and fastened to itself to enclose the spine, and a blower attachment.

10. The isolation apparatus according to claim 9, wherein the upper enclosure component comprises glove arms extendable into the patient chamber and accessible from outside the enclosure, each of the glove arms including a retraction tab inside each glove arm for retracting each glove arm within the patient chamber, wherein the retraction tab comprises a free end with a fastener corresponding to a counterpart fastener on an outer surface of the upper enclosure component.

11. The isolation apparatus according to claim 9, wherein the upper enclosure component comprises a pass-through port including a passage with an internal end adjacent and/or within the patient chamber, and an external end outside of the patient chamber, wherein each of the internal end and the external end comprises a resealable opening, wherein each resealable opening comprises a zipper, and the pass-through port is configured to receive an object into the passage through the external end, and when an external end resealable opening is closed, an internal end resealable opening can be opened to access the object from the passage through the internal end.

12. An isolation apparatus for transporting a patient, comprising:

an enclosure having a base to receive the patient thereon, and an upper enclosure component connected to the base and enclosing a patient chamber over the base, the upper enclosure component including a transparent window panel and two opposite end walls, and the enclosure being foldable into a collapsed form having a reduced length and a diameter no larger than that of an expanded enclosure;

the upper enclosure component supported by a plurality of spaced apart lateral ribs, and each lateral rib is configured to flex and press outward on the upper enclosure component, wherein each lateral rib comprises a first outer rib element and a second inner rib element, wherein the second inner rib element biases outward upon the first outer rib element, and a blower attachment.

13. The isolation apparatus according to claim 12, wherein each lateral rib is secured at opposing ends in rib pockets connected to the upper enclosure component.

14. The isolation apparatus according to claim 12, wherein the upper enclosure component comprises a pass-through port including a passage with an internal end adjacent and/or within the patient chamber, and an external end outside of the patient chamber, wherein each of the internal end and the external end comprises a resealable opening, wherein each resealable opening comprises a zipper, and the pass-through port is configured to receive an object into the passage through the external end, and when an external end resealable opening is closed, an internal end resealable opening can be opened to access the object from the passage through the internal end.

15. The isolation apparatus according to claim 12, wherein the upper enclosure component comprises glove arms extendable into the patient chamber and accessible from outside the enclosure, each of the glove arms including a retraction tab inside each glove arm for retracting each glove arm within the patient chamber, wherein the retraction tab comprises a free end with a fastener corresponding to a counterpart fastener on an outer surface of the upper enclosure component.

16. An isolation apparatus for transporting a patient, comprising:

an enclosure having a base to receive the patient thereon, and an upper enclosure component connected to the base and enclosing a patient chamber over the base, the upper enclosure component including a transparent window panel and two opposite end walls, and the enclosure being foldable into a collapsed form having a reduced length and a diameter no larger than that of an expanded enclosure;

the upper enclosure component supported by a plurality of spaced apart lateral ribs, and each lateral rib is configured to flex and press outward on the upper enclosure component, wherein each lateral rib is secured at opposing ends in rib pockets connected to the upper enclosure component, wherein each lateral rib is further secured to the upper enclosure component by a plurality of straps, and each strap adjacent to one of the rib pockets is connected on an inside of each lateral rib to the corresponding rib pocket by an adjustable fastener; and a blower attachment.

17. The isolation apparatus according to claim 16, wherein the upper enclosure component comprises a pass-through port including a passage with an internal end adjacent and/or within the patient chamber, and an external end outside of the patient chamber, wherein each of the internal end and the external end comprises a resealable opening, wherein each resealable opening comprises a zipper, and the pass-through port is configured to receive an object into the passage through the external end, and when an external end resealable opening is closed, an internal end resealable opening can be opened to access the object from the passage through the internal end.

18. An isolation apparatus for transporting a patient, comprising:

an enclosure having a base to receive the patient thereon, and an upper enclosure component connected to the base and enclosing a patient chamber over the base, the upper enclosure component including a transparent window panel and two opposite end walls, and the enclosure being foldable into a collapsed form having a reduced length and a diameter no larger than that of an expanded enclosure, wherein the transparent window panel includes a fastener near an upper portion of the patient chamber and configured to receive a light source, wherein the fastener is configured to reduce emission of outward light through the transparent window panel, and a blower attachment.

19. The isolation apparatus according to claim 18, further comprising the light source, wherein the light source is a chemical light stick configured to attach to the fastener.

20. An isolation apparatus for transporting a patient, comprising:

an enclosure having a base to receive the patient thereon, and an upper enclosure component connected to the base and enclosing a patient chamber over the base, the upper enclosure component including a transparent window panel and two opposite end walls, and the enclosure being foldable into a collapsed form having a reduced length and a diameter no larger than that of an expanded enclosure;

a zipper extending between the base and three sides of the upper enclosure component, and a zipper flap on an external surface of the upper enclosure component and configured to cover the zipper when closed, wherein the zipper flap comprises a transparent panel at least over a top stop end of the zipper; and a blower attachment.

* * * * *